US012572328B2

(12) United States Patent
Hameed

(10) Patent No.: US 12,572,328 B2
(45) Date of Patent: Mar. 10, 2026

(54) LIST SEARCH

(71) Applicant: Cypress Semiconductor Corporation, San Jose, CA (US)

(72) Inventor: Muhammad Hameed, Parkland, FL (US)

(73) Assignee: Infineon Technologies Americas Corp., El Segundo, CA (US)

( * ) Notice: Subject to any disclaimer, the term of this patent is extended or adjusted under 35 U.S.C. 154(b) by 70 days.

(21) Appl. No.: 18/609,754

(22) Filed: Mar. 19, 2024

(65) Prior Publication Data

US 2025/0103285 A1    Mar. 27, 2025

Related U.S. Application Data

(60) Provisional application No. 63/585,185, filed on Sep. 25, 2023.

(51) Int. Cl.
*G06F 16/00* (2019.01)
*G06F 7/02* (2006.01)

(52) U.S. Cl.
CPC .......... *G06F 7/02* (2013.01); *G06F 2207/025* (2013.01)

(58) Field of Classification Search
CPC ........ G06F 16/24; G06F 16/33; G06F 16/835; G06F 16/951
See application file for complete search history.

(56) References Cited

U.S. PATENT DOCUMENTS

| | | | | |
|---|---|---|---|---|
| 9,984,131 | B2 * | 5/2018 | Rogers | G06F 16/334 |
| 11,003,659 | B2 * | 5/2021 | Masuko | G06F 16/9032 |
| 11,151,148 | B2 * | 10/2021 | Tanaka | G06F 16/90324 |
| 11,500,918 | B2 * | 11/2022 | Jung | G06Q 30/0283 |
| 2016/0140243 | A1 * | 5/2016 | Adams | G06F 16/9535 707/706 |
| 2021/0357467 | A1 * | 11/2021 | Dimov | G06F 16/243 |
| 2023/0070618 | A1 * | 3/2023 | Mishra | G06F 40/205 |

* cited by examiner

*Primary Examiner* — Noosha Arjomandi

(57) ABSTRACT

A memory stores an item list in first words and second words such that each first word stores a first portion of two different list items and each second word stores a second portion of the two different list items. Control logic is configured to compare a first portion of a search item to the first portion of each list item in each first word; in response to the first portion of the search item matching a first portion in a first word, determine the first word is a matching first word; compare a second portion of the search item to the second portion of each list item stored in each second word corresponding to each matching first word; and in response to the second portion of the search item matching a second portion of a list item in a second word, determine the search item matches the list item.

20 Claims, 12 Drawing Sheets

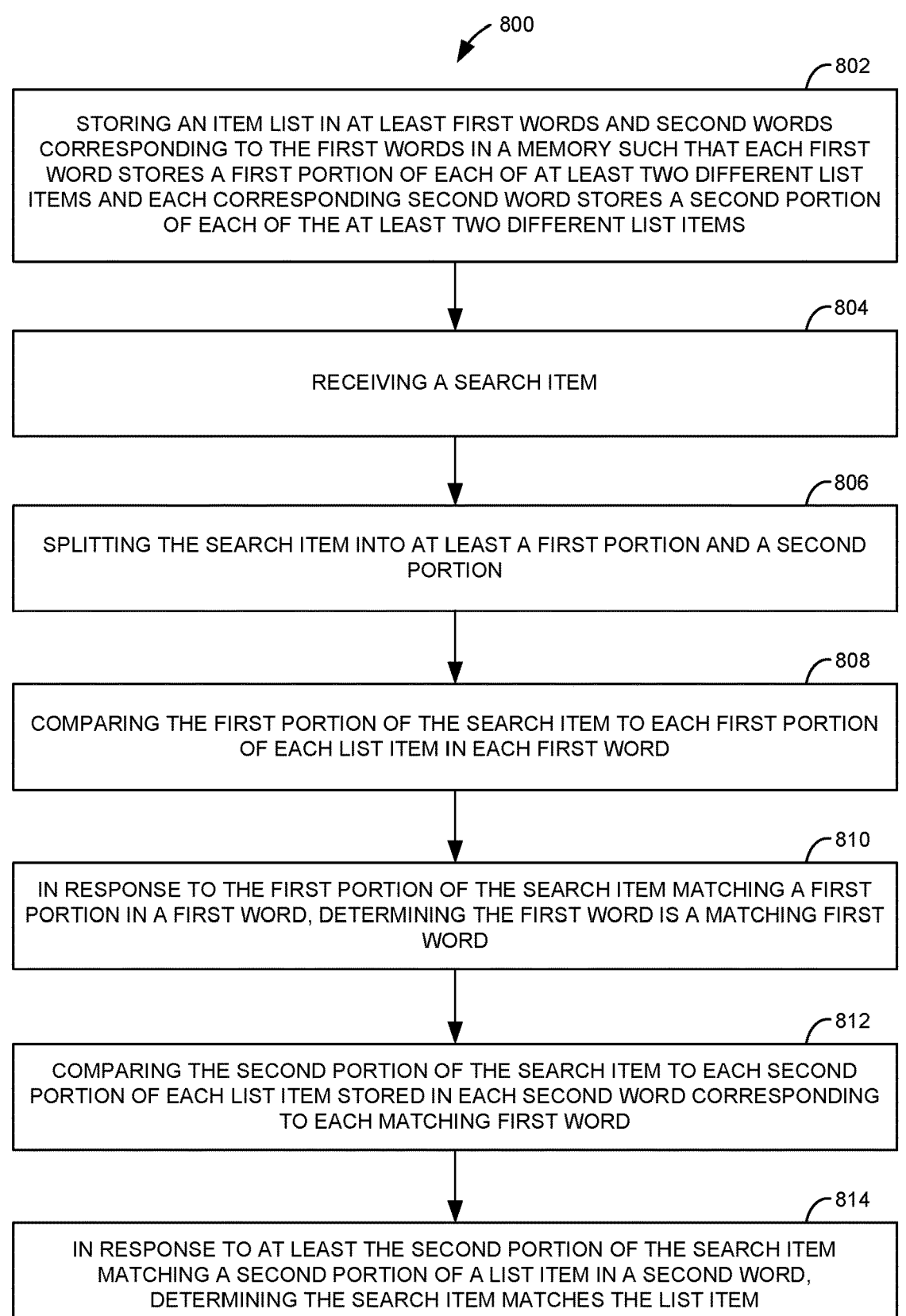

802

STORING AN ITEM LIST IN AT LEAST FIRST WORDS AND SECOND WORDS CORRESPONDING TO THE FIRST WORDS IN A MEMORY SUCH THAT EACH FIRST WORD STORES A FIRST PORTION OF EACH OF AT LEAST TWO DIFFERENT LIST ITEMS AND EACH CORRESPONDING SECOND WORD STORES A SECOND PORTION OF EACH OF THE AT LEAST TWO DIFFERENT LIST ITEMS

804

RECEIVING A SEARCH ITEM

806

SPLITTING THE SEARCH ITEM INTO AT LEAST A FIRST PORTION AND A SECOND PORTION

808

COMPARING THE FIRST PORTION OF THE SEARCH ITEM TO EACH FIRST PORTION OF EACH LIST ITEM IN EACH FIRST WORD

810

IN RESPONSE TO THE FIRST PORTION OF THE SEARCH ITEM MATCHING A FIRST PORTION IN A FIRST WORD, DETERMINING THE FIRST WORD IS A MATCHING FIRST WORD

812

COMPARING THE SECOND PORTION OF THE SEARCH ITEM TO EACH SECOND PORTION OF EACH LIST ITEM STORED IN EACH SECOND WORD CORRESPONDING TO EACH MATCHING FIRST WORD

814

IN RESPONSE TO AT LEAST THE SECOND PORTION OF THE SEARCH ITEM MATCHING A SECOND PORTION OF A LIST ITEM IN A SECOND WORD, DETERMINING THE SEARCH ITEM MATCHES THE LIST ITEM

FIG. 8A

800

826

STORING THE ITEM LIST IN AT LEAST FIRST WORDS, SECOND WORDS CORRESPONDING TO THE FIRST WORDS, THIRD WORDS CORRESPONDING TO THE SECOND WORDS, AND FOURTH WORDS CORRESPONDING TO THE THIRD WORDS IN THE MEMORY SUCH THAT EACH FIRST WORD STORES THE FIRST PORTION OF EACH OF AT LEAST FOUR DIFFERENT LIST ITEMS, EACH CORRESPONDING SECOND WORD STORES THE SECOND PORTION OF EACH OF THE AT LEAST FOUR DIFFERENT LIST ITEMS, EACH CORRESPONDING THIRD WORD STORES THE THIRD PORTION OF EACH OF THE AT LEAST FOUR DIFFERENT LIST ITEMS, AND EACH CORRESPONDING FOURTH WORD STORES A FOURTH PORTION OF EACH OF THE AT LEAST FOUR DIFFERENT LIST ITEMS

828

SPLITTING THE SEARCH ITEM INTO AT LEAST THE FIRST PORTION, THE SECOND PORTION, THE THIRD PORTION, AND A FOURTH PORTION

830

IN RESPONSE TO THE THIRD PORTION OF THE SEARCH ITEM MATCHING A THIRD PORTION IN A THIRD WORD, DETERMINING THE THIRD WORD IS A MATCHING THIRD WORD

832

COMPARING THE FOURTH PORTION OF THE SEARCH ITEM TO EACH FOURTH PORTION OF EACH LIST ITEM STORED IN EACH FOURTH WORD CORRESPONDING TO EACH MATCHING THIRD WORD

834

IN RESPONSE TO AT LEAST THE FOURTH PORTION OF THE SEARCH ITEM MATCHING A FOURTH PORTION OF A LIST ITEM IN A FOURTH WORD, DETERMINING THE SEARCH ITEM MATCHES THE LIST ITEM

FIG. 8C

LIST SEARCH

CROSS REFERENCE TO RELATED APPLICATIONS

This Non-Provisional patent application claims the benefit of the filing date of U.S. Provisional Patent Application Ser. No. 63/585,185, filed Sep. 25, 2023, which is herein incorporated by reference.

BACKGROUND

Searching an unsorted list or array including unique values may be a time consuming task. A linear search requires serially looking through each entry in the unsorted list to find a matching entry. A binary search is not possible since the list is unsorted. A hash-based search requires a hash function, extra memory for a hash table, a rehashing approach, and additional data structures.

For these and other reasons, a need exists for the present invention.

SUMMARY

Some examples of the present disclosure relate to a system. The system includes a memory and control logic communicatively coupled to the memory. The memory stores an item list in first words and second words corresponding to the first words such that each first word stores a first portion of each of two different list items and each corresponding second word stores a second portion of each of the two different list items. The control logic is configured to compare a first portion of a search item to the first portion of each list item in each first word. The control logic is configured to, in response to the first portion of the search item matching a first portion in a first word, determine the first word is a matching first word. The control logic is configured to compare a second portion of the search item to the second portion of each list item stored in each second word corresponding to each matching first word. The control logic is configured to in response to the second portion of the search item matching a second portion of a list item in a second word, determine the search item matches the list item.

Other examples of the present disclosure relate to a system. The system includes a memory and control logic communicatively coupled to the memory. The memory stores an item list in at least first words and second words corresponding to the first words such that each first word stores a first portion of each of at least two different list items and each corresponding second word stores a second portion of each of the at least two different list items. The control logic is configured to receive a search item and split the search item into at least a first portion and a second portion. The control logic is configured to compare the first portion of the search item to each first portion of each list item in each first word. The control logic is configured to, in response to the first portion of the search item matching a first portion in a first word, determine the first word is a matching first word. The control logic is configured to compare the second portion of the search item to each second portion of each list item stored in each second word corresponding to each matching first word. The control logic is configured to in response to at least the second portion of the search item matching a second portion of a list item in a second word, determine the search item matches the list item.

Yet other examples of the present disclosure relate to a method. The method includes storing an item list in at least first words and second words corresponding to the first words in a memory such that each first word stores a first portion of each of at least two different list items and each corresponding second word stores a second portion of each of the at least two different list items. The method includes receiving a search item and splitting the search item into at least a first portion and a second portion. The method includes comparing the first portion of the search item to each first portion of each list item in each first word. The method includes, in response to the first portion of the search item matching a first portion in a first word, determining the first word is a matching first word. The method includes comparing the second portion of the search item to each second portion of each list item stored in each second word corresponding to each matching first word. The method includes, in response to at least the second portion of the search item matching a second portion of a list item in a second word, determining the search item matches the list item.

BRIEF DESCRIPTION OF THE DRAWINGS

FIGS. 8A-8C are flow diagrams illustrating one example of a method for performing a search operation.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
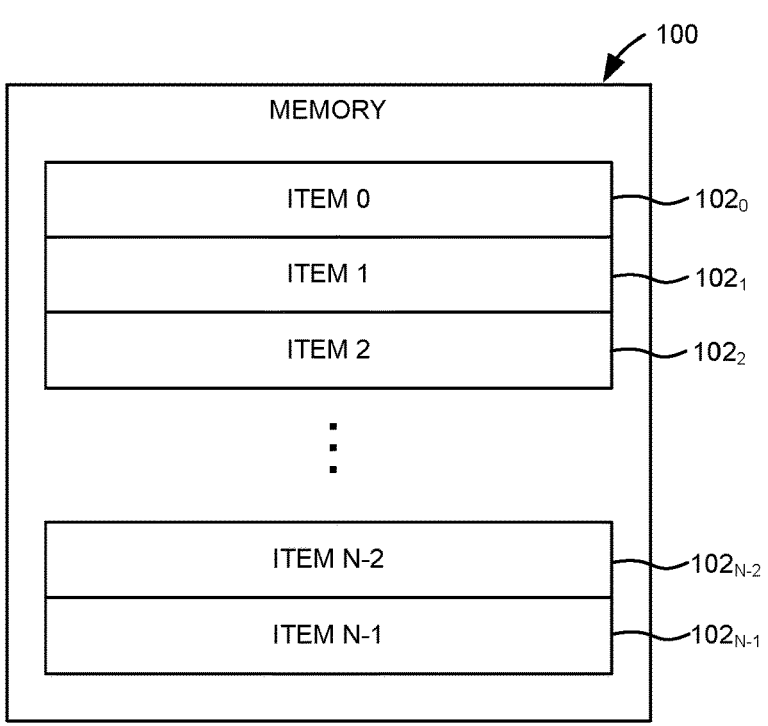
FIG. 1 is a block diagram illustrating one example of a list stored in a memory.

FIG. 1 is a block diagram illustrating one example of an item list stored in a memory 100. Memory 100 stores the item list including items 0 to N−1 in words $102_0$ to $102_{N-1}$, respectively, where "N" is any suitable number of items.

Each word (or row) of memory 100 may be defined as the width of the memory sub-system (e.g., 16 bit, 32 bit, 48 bit, 64 bit, etc.) such that each item 0 to N–1 is stored within one word (or row) of memory. The item list may be unsorted and may include any suitable data, such as Bluetooth addresses. Memory 100 may include any suitable machine-readable storage medium, for example, a random access memory (RAM), an electrically-erasable programmable read-only memory (EEPROM), a storage drive, an optical disc, and the like.

Figure 2:
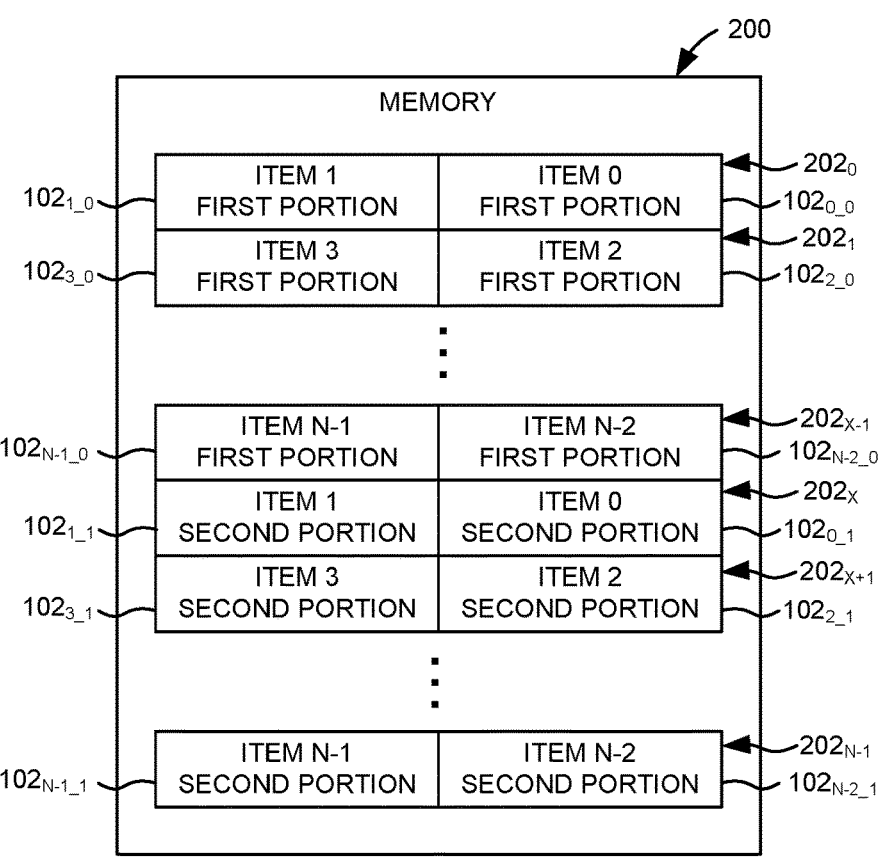
FIG. 2 is a block diagram illustrating another example of a list stored in a memory.

FIG. 2 is a block diagram illustrating another example of a list stored in a memory 200. In this example, each item 0 to N–1 in the list is split into a first portion $102_{0\_0}$ to $102_{N-1\_0}$ and a second portion $102_{0\_1}$ to $102_{N-1\_1}$, respectively. In this example, if the item list includes an odd number of items N, a dummy (e.g., blank) item may be added to the list such that item N–1 is a dummy item. Memory 200 stores the item list including items 0 to N–1 in first words $202_0$ to $202_{X-1}$ and second words $202_X$ to $202_{N-1}$ corresponding to the first words (e.g., second word $202_X$ corresponds to first word $202_0$, second word $202_{X+1}$ corresponds to first word $202_1$, etc.). In some examples, the second words $202_X$ to $202_{N-1}$ are stored in the memory 200 immediately following the first words $202_0$ to $202_{X-1}$. Each first word $202_0$ to $202_{X-1}$ stores the first portion $102_{0\_0}$ to $102_{N-1\_0}$ of each of two different list items. For example, word $202_0$ of memory 200 stores the first portion $102_{0\_0}$ of item 0 in a first part (e.g., lower half) of the word and the first portion $102_{1\_0}$ of item 1 in a second part (e.g., upper half) of the word, word $202_1$ of memory 200 stores the first portion $102_{2\_0}$ of item 2 in the first part of the word and the first portion $102_{3\_0}$ of item 3 in the second part of the word, etc., and word $202_{X-1}$ of memory 200 stores the first portion $102_{N-2\_0}$ of item N–2 in the first part of the word and the first portion $102_{N-1\_0}$ of item N–1 in the second part of the word.

Each second word $202_X$ to $202_{N-1}$ stores the second portion $102_{0\_1}$ to $102_{N-1\_1}$ of each of two different list items. For example, word $202_X$ of memory 200 stores the second portion $102_{0\_1}$ of item 0 in the first part of the word and the second portion $102_{1\_1}$ of item 1 in the second part of the word, word $202_{X+1}$ of memory 200 stores the second portion $102_{2\_1}$ of item 2 in the first part of the word and the second portion $102_{3\_1}$ of item 3 in the second part of the word, etc., and word $202_{N-1}$ of memory 200 stores the second portion $102_{N-2\_1}$ of item N–2 in the first part of the word and the second portion $102_{N-1\_1}$ of item N–1 in the second part of the word.

By storing the first portions of each item 0 to N–1 in first words $202_0$ to $202_{X-1}$ and the second portions of each item 0 to N–1 in second words $202_X$ to $202_{N-1}$, the time to search the item list stored in memory 200 may be substantially reduced compared to the time to search the same item list stored in memory 100 of FIG. 1 as will be further described below with reference to FIGS. 5A and 5B. In some examples, the time to search the item list stored in memory 200 may be improved by a factor of N by comparing a portion of a search item value to corresponding portions of multiple list items simultaneously instead of comparing each individual list item value to a single complete search item value. The time to search the item list is improved by a factor of N since most of the comparisons will fail and the remaining portion(s) of the search item value will not have to be compared.

Figure 3:
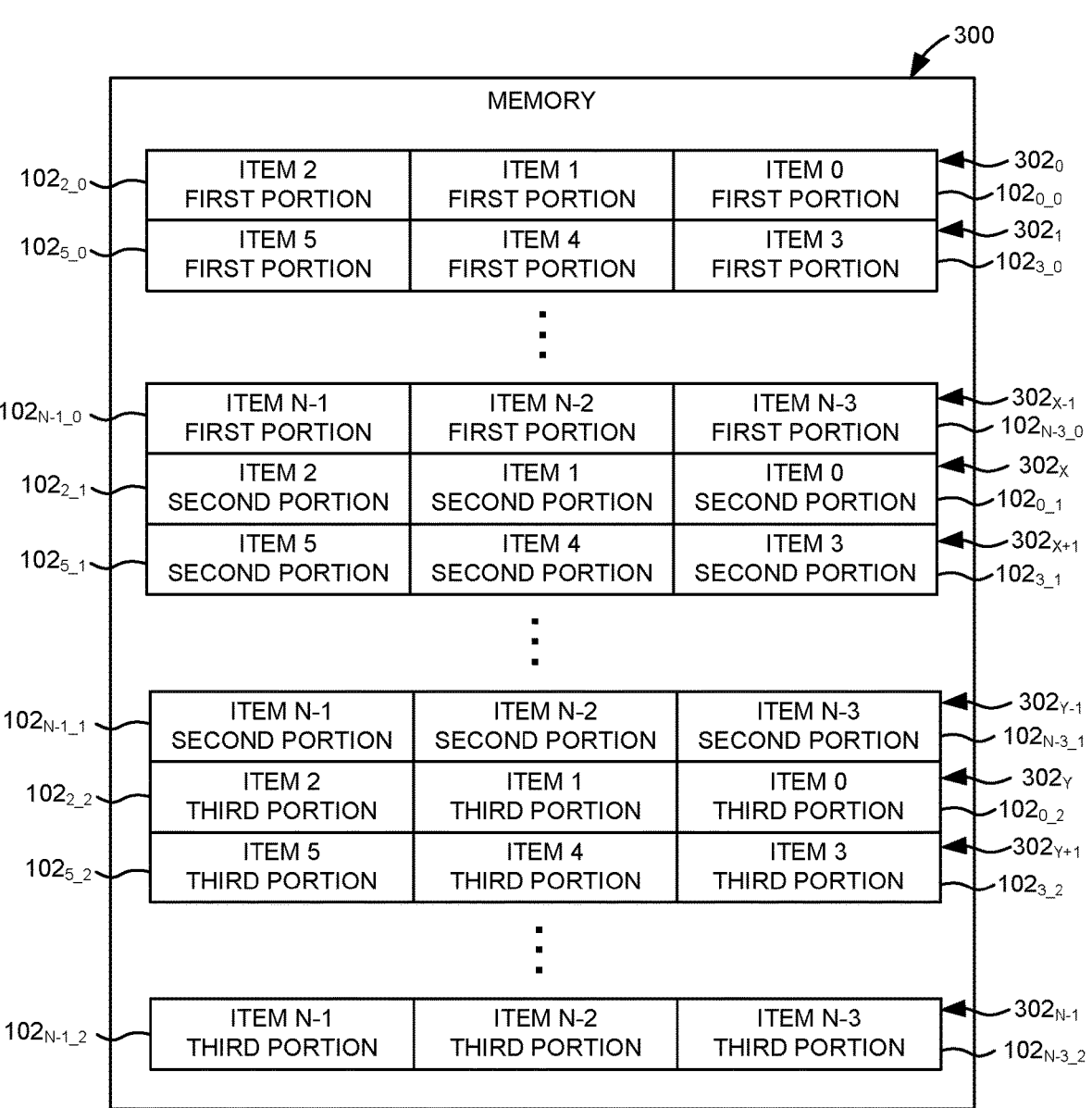
FIG. 3 is a block diagram illustrating another example of a list stored in a memory.

FIG. 3 is a block diagram illustrating another example of a list stored in a memory 300. In this example, each item 0 to N–1 in the list is split into a first portion $102_{0\_0}$ to $102_{N-1\_0}$, a second portion $102_{0\_1}$ to $102_{N-1\_1}$, and a third portion $102_{0\_2}$ to $102_{N-1\_2}$, respectively. While not all first portions $102_{0\_0}$ to $102_{N-1\_0}$, second portions $102_{0\_1}$ to $102_{N-1\_1}$, and a third portions $102_{0\_2}$ to $102_{N-1\_2}$ are specifically labeled in FIG. 3, it will be apparent that each first portion $102_{0\_0}$ to $102_{N-1\_0}$, second portion $102_{0\_1}$ to $102_{N-1\_1}$, and third portion $102_{0\_2}$ to $102_{N-1\_2}$ corresponds to a first portion of items 0 to N–1, a second portion of items 0 to N–1, and a third portion of items 0 to N–1, respectively. In this example, if the item list includes a number of items N that is not divisible by 3, one or two dummy (e.g., blank) items (e.g., item N–1, item N–2) may be added to the list such that the number of items N is divisible by 3.

Memory 300 stores the item list including items 0 to N–1 in first words $302_0$ to $302_{X-1}$, second words $302_X$ to $302_{Y-1}$ corresponding to the first words, and third words $302_Y$ to $302_{N-1}$ corresponding to the second words and corresponding to the first words. In some examples, the second words $302_X$ to $302_{Y-1}$ are stored in the memory 300 immediately following the first words $302_0$ to $302_{X-1}$, and the third words $302_Y$ to $302_{N-1}$ are stored in the memory 300 immediately following the second words $302_X$ to $302_{Y-1}$. For example, third word $302_Y$ and second word $302_X$ correspond to first word $302_0$, third word $302_{Y+1}$ and second word $302_{X+1}$ correspond to first word $302_1$, etc. Each first word $302_0$ to $302_{X-1}$ stores the first portion $102_{0\_0}$ to $102_{N-1\_0}$ of each of three different list items. For example, word $302_0$ of memory 300 stores the first portion $102_{0\_0}$ of item 0 in a first part (e.g., lower third) of the word, the first portion $102_{1\_0}$ of item 1 in a second part (e.g., middle third) of the word, and the first portion $102_{2\_0}$ of item 2 in a third part (e.g., upper third) of the word; word $302_1$ of memory 300 stores the first portion $102_{3\_0}$ of item 3 in the first part of the word, the first portion $102_{4\_0}$ of item 4 in the second part of the word, and the first portion $102_{5\_0}$ of item 5 in the third part of the word; etc.; and word $302_{X-1}$ of memory 300 stores the first portion $102_{N-3\_0}$ of item N–3 in the first part of the word, the first portion $102_{N-2\_0}$ of item N–2 in the second part of the word, and the first portion $102_{N-1\_0}$ of item N–1 in the third part of the word.

Each second word $302_X$ to $302_{Y-1}$ stores the second portion $102_{0\_1}$ to $102_{N-1\_1}$ of each of three different list items. For example, word $302_X$ of memory 300 stores the second portion $102_{0\_1}$ of item 0 in the first part of the word, the second portion $102_{1\_1}$ of item 1 in the second part of the word, and the second portion $102_{2\_1}$ of item 2 in the third part of the word; word $302_{X+1}$ of memory 300 stores the second portion $102_{3\_1}$ of item 3 in the first part of the word, the second portion $102_{4\_1}$ of item 4 in the second part of the word, and the second portion $102_{5\_1}$ of item 5 in the third part of the word; etc.; and word $302_{Y-1}$ of memory 300 stores the second portion $102_{N-3\_1}$ of item N–3 in the first part of the word, the second portion $102_{N-2\_1}$ of item N–2 in the second part of the word, and second portion $102_{N-1\_1}$ of item N–1 in the third part of the word.

Each third word $302_Y$ to $302_{N-1}$ stores the third portion $102_{0\_2}$ to $102_{N-1\_2}$ of each of three different list items. For example, word $302_Y$ of memory 300 stores the third portion $102_{0\_2}$ of item 0 in the first part of the word, the third portion $102_{1\_2}$ of item 1 in the second part of the word, and the third portion $102_{2\_2}$ of item 2 in the third part of the word; word $302_{Y+1}$ of memory 300 stores the third portion $102_{3\_2}$ of item 3 in the first part of the word, the third portion $102_{4\_2}$ of item 4 in the second part of the word, and the third portion $102_{5\_2}$ of item 5 in the third part of the word; etc.; and word $302_{N-1}$ of memory 300 stores the third portion $102_{N-3\_2}$ of item N–3 in the first part of the word, the second portion $102_{N-2\_2}$ of item N–2 in the second part of the word, and second portion $102_{N-1\_2}$ of item N–1 in the third part of the word.

By storing the first portions of each item 0 to N–1 in first words $302_0$ to $302_{X-1}$, the second portions of each item 0 to N–1 in second words $302_X$ to $302_{Y-1}$, and the third portions of each item 0 to N–1 in third words $302_Y$ to $302_{N-1}$, the time to search the item list stored in memory 300 may be substantially reduced compared to the time to search the same item list stored in memory 100 of FIG. 1 as will be further described below with reference to FIG. 6.

Figure 4:
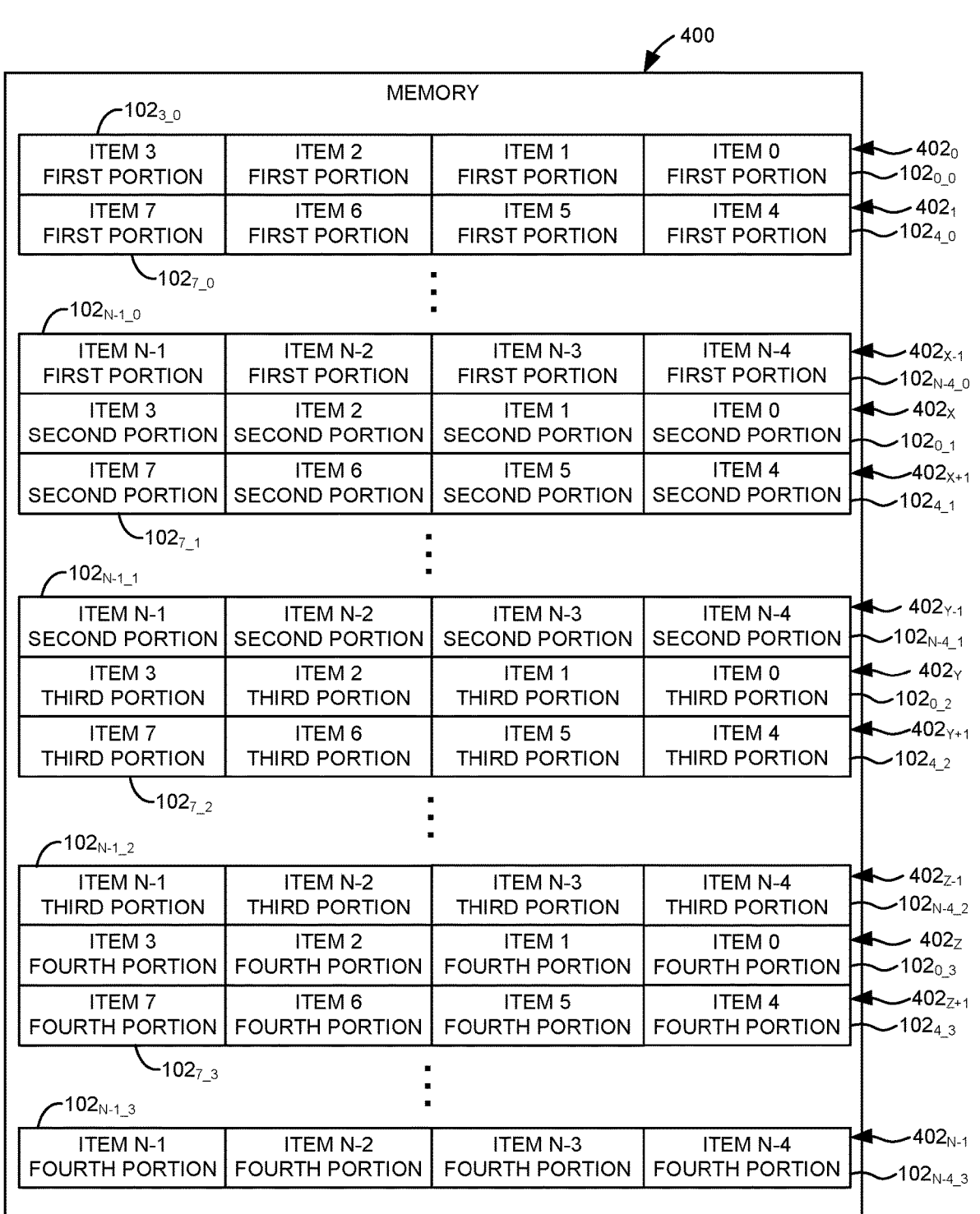
FIG. 4 is a block diagram illustrating another example of a list stored in a memory.

FIG. 4 is a block diagram illustrating another example of a list stored in a memory 400. In this example, each item 0 to N–1 in the list is split into a first portion $102_{0\_0}$ to $102_{N-1\_0}$, a second portion $102_{0\_1}$ to $102_{N-1\_1}$, a third portion $102_{0\_2}$ to $102_{N-1\_2}$, and a fourth portion $102_{0\_3}$ to $102_{N-1\_3}$, respectively. While not all first portions $102_{0\_0}$ to $102_{N-1\_0}$, second portions $102_{0\_1}$ to $102_{N-1\_1}$, third portions $102_{0\_2}$ to $102_{N-1\_2}$, and fourth portions $102_{0\_3}$ to $102_{N-1\_3}$ are specifically labeled in FIG. 4, it will be apparent that each first portion $102_{0\_0}$ to $102_{N-1\_0}$, second portion $102_{0\_1}$ to $102_{N-1\_1}$, third portion $102_{0\_2}$ to $102_{N-1\_2}$, and fourth portion $102_{0\_3}$ to $102_{N-1\_3}$ corresponds to a first portion of items 0 to N–1, a second portion of items 0 to N–1, a third portion of items 0 to N–1, and a fourth portion of item 0 to N–1, respectively. In this example, if the item list includes a number of items N that is not divisible by 4, one, two or three dummy (e.g., blank) items (e.g., item N–1, item N–2, item N–3) may be added to the list such that the number of items N is divisible by 4.

Memory 400 stores the item list including items 0 to N–1 in first words $402_0$ to $402_{X-1}$, second words $402_X$ to $402_{Y-1}$ corresponding to the first words, third words $402_Y$ to $402_{Z-1}$ corresponding to the second words and corresponding to the first words, and fourth words $402_Z$ to $402_{N-1}$ corresponding to the third words and corresponding to the first words and second words. In some examples, the second words $402_X$ to $402_{Y-1}$ are stored in the memory 400 immediately following the first words $402_0$ to $402_{X-1}$, the third words $402_Y$ to $402_{Z-1}$ are stored in the memory 400 immediately following the second words $402_X$ to $402_{Y-1}$, and the fourth words $402_Z$ to $402_{N-1}$ are stored in the memory 400 immediately following the third words $402_Y$ to $402_{Z-1}$. Each first word $402_0$ to $402_{X-1}$ stores the first portion $102_{0\_0}$ to $102_{N-1\_0}$ of each of four different list items. For example, word $402_0$ of memory 400 stores the first portion $102_{0\_0}$ of item 0 in a first part (e.g., lower quarter) of the word, the first portion $102_{1\_0}$ of item 1 in a second part (e.g., middle-lower quarter) of the word, the first portion $102_{2\_0}$ of item 2 in a third part (e.g., middle-upper quarter) of the word, and the first portion $102_{3\_0}$ of item 3 in a fourth part (e.g., upper quarter) of the word; word $402_1$ of memory 400 stores the first portion $102_{4\_0}$ of item 4 in the first part of the word, the first portion $102_{5\_0}$ of item 5 in the second part of the word, the first portion $102_{6\_0}$ of item 6 in the third part of the word, and the first portion $102_{7\_0}$ of item 7 in the fourth part of the word; etc.; and word $402_{X-1}$ of memory 400 stores the first portion $102_{N-4\_0}$ of item N–4 in the first part of the word, the first portion $102_{N-3\_0}$ of item N–3 in the second part of the word, the first portion $102_{N-2\_0}$ of item N–2 in the third part of the word, and the first portion $102_{N-1\_0}$ Of item N–1 in the fourth part of the word.

Each second word $402_X$ to $402_{Y-1}$ stores the second portion $102_{0\_1}$ to $102_{N-1\_1}$ of each of four different list items. For example, word $402_X$ of memory 400 stores the second portion $102_{0\_1}$ of item 0 in the first part of the word, the second portion $102_{1\_1}$ of item 1 in the second part of the word, the second portion $102_{2\_1}$ of item 2 in the third part of the word, and the second portion $102_{3\_1}$ of item 3 in the fourth part of the word; word $402_{X+1}$ of memory 400 stores the second portion $102_{4\_1}$ of item 4 in the first part of the word, the second portion $102_{5\_1}$ of item 5 in the second part of the word, the second portion $102_{6\_1}$ of item 6 in the third part of the word, and the second portion $102_{7\_1}$ of item 7 in the fourth part of the word; etc.; and word $402_{Y-1}$ of memory 400 stores the second portion $102_{N-4\_1}$ of item N–4 in the first part of the word, the second portion $102_{N-3\_1}$ of item N–3 in the second part of the word, the second portion $102_{N-2\_1}$ of item N–2 in the third part of the word, and the second portion $102_{N-1\_1}$ of item N–1 in the fourth part of the word.

Each third word $402_Y$ to $402_{Z-1}$ stores the third portion $102_{0\_2}$ to $102_{N-1\_2}$ of each of four different list items. For example, word $402_Y$ of memory 400 stores the third portion $102_{0\_2}$ of item 0 in the first part of the word, the third portion $102_{1\_2}$ of item 1 in the second part of the word, the third portion $102_{2\_2}$ of item 2 in the third part of the word, and the third portion $102_{3\_2}$ of item 3 in the fourth part of the word; word $402_Y+1$ of memory 400 stores the third portion $102_{4\_2}$ of item 4 in the first part of the word, the third portion $102_{5\_2}$ of item 5 in the second part of the word, the third portion $102_{6\_2}$ of item 6 in the third part of the word, and the third portion $102_{7\_2}$ of item 7 in the fourth part of the word; etc.; and word $402_{Z-1}$ of memory 400 stores the third portion $102_{N-4\_2}$ of item N–4 in the first part of the word, the third portion $102_{N-3\_2}$ of item N–3 in the second part of the word, the third portion $102_{N-2\_2}$ of item N–2 in the third part of the word, and the third portion $102_{N-1\_2}$ of item N–1 in the fourth part of the word.

Each fourth word $402_Z$ to $402_{N-1}$ stores the fourth portion $102_{0\_3}$ to $102_{N-1\_3}$ of each of four different list items. For example, word $402_Z$ of memory 400 stores the fourth portion $102_{0\_3}$ of item 0 in the first part of the word, the fourth portion $102_{1\_3}$ of item 1 in the second part of the word, the fourth portion $102_{2\_3}$ of item 2 in the third part of the word, and the fourth portion $102_{3\_3}$ of item 3 in the fourth part of the word; word $402_{Z+1}$ of memory 400 stores the fourth portion $102_{4\_3}$ of item 4 in the first part of the word, the fourth portion $102_{5\_3}$ of item 5 in the second part of the word, the fourth portion $102_{6\_3}$ of item 6 in the third part of the word, and the fourth portion $102_{7\_3}$ of item 7 in the fourth part of the word; etc.; and word $402_{N-1}$ of memory 400 stores the fourth portion $102_{N-4\_3}$ of item N–4 in the first part of the word, the fourth portion $102_{N-3\_3}$ of item N–3 in the second part of the word, the fourth portion $102_{N-2\_3}$ of item N–2 in the third part of the word, and the fourth portion $102_{N-1\_3}$ of item N–1 in the fourth part of the word.

Figure 7:
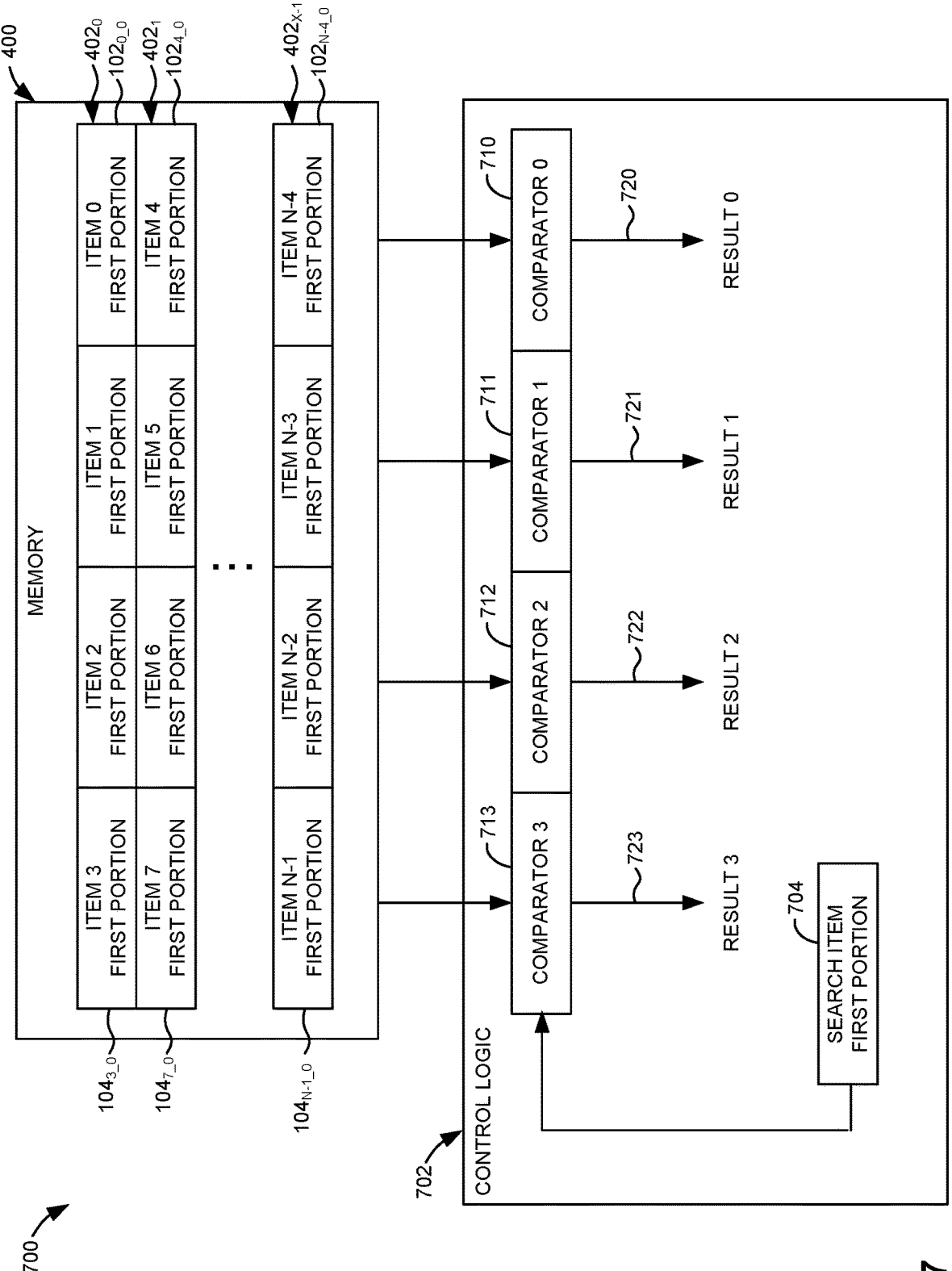
FIG. 7 is a block diagram illustrating one example of a system for performing a search operation on the list stored in the memory of FIG. 4.

By storing the first portions of each item 0 to N–1 in first words $402_0$ to $402_{X-1}$, the second portions of each item 0 to N–1 in second words $402_X$ to $402_{Y-1}$, the third portions of each item 0 to N–1 in third words $402_Y$ to $402_{Z-1}$, and the fourth portions of each item 0 to N–1 in fourth words $402_Z$ to $402_{N-1}$, the time to search the item list stored in memory 400 may be substantially reduced compared to the time to search the same item list stored in memory 100 of FIG. 1 as will be further described below with reference to FIG. 7.

Figure 5A:
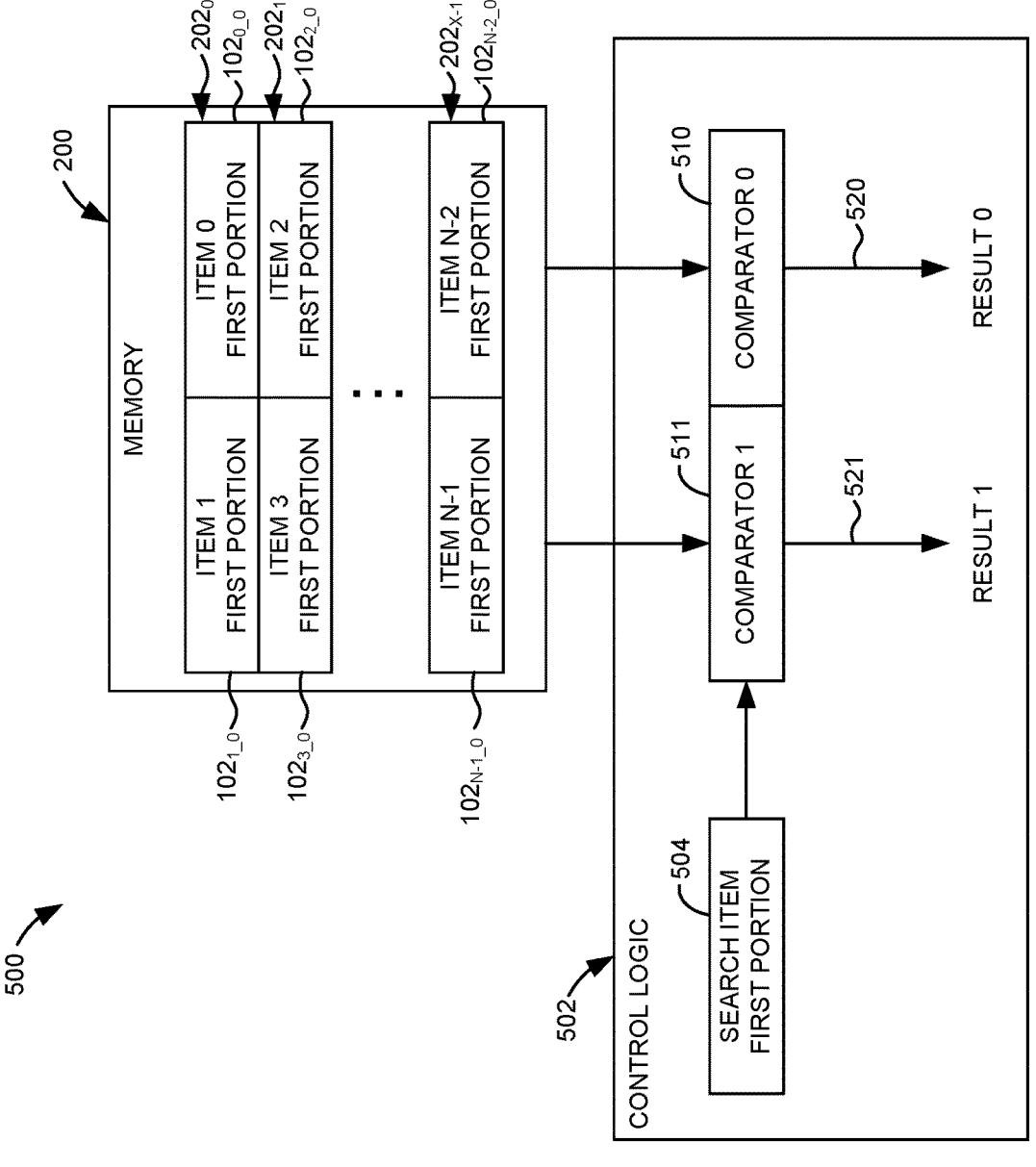
FIGS. 5A and 5B are block diagrams illustrating one example of a system for performing a search operation on the list stored in the memory of FIG. 2.
Figure 5B:
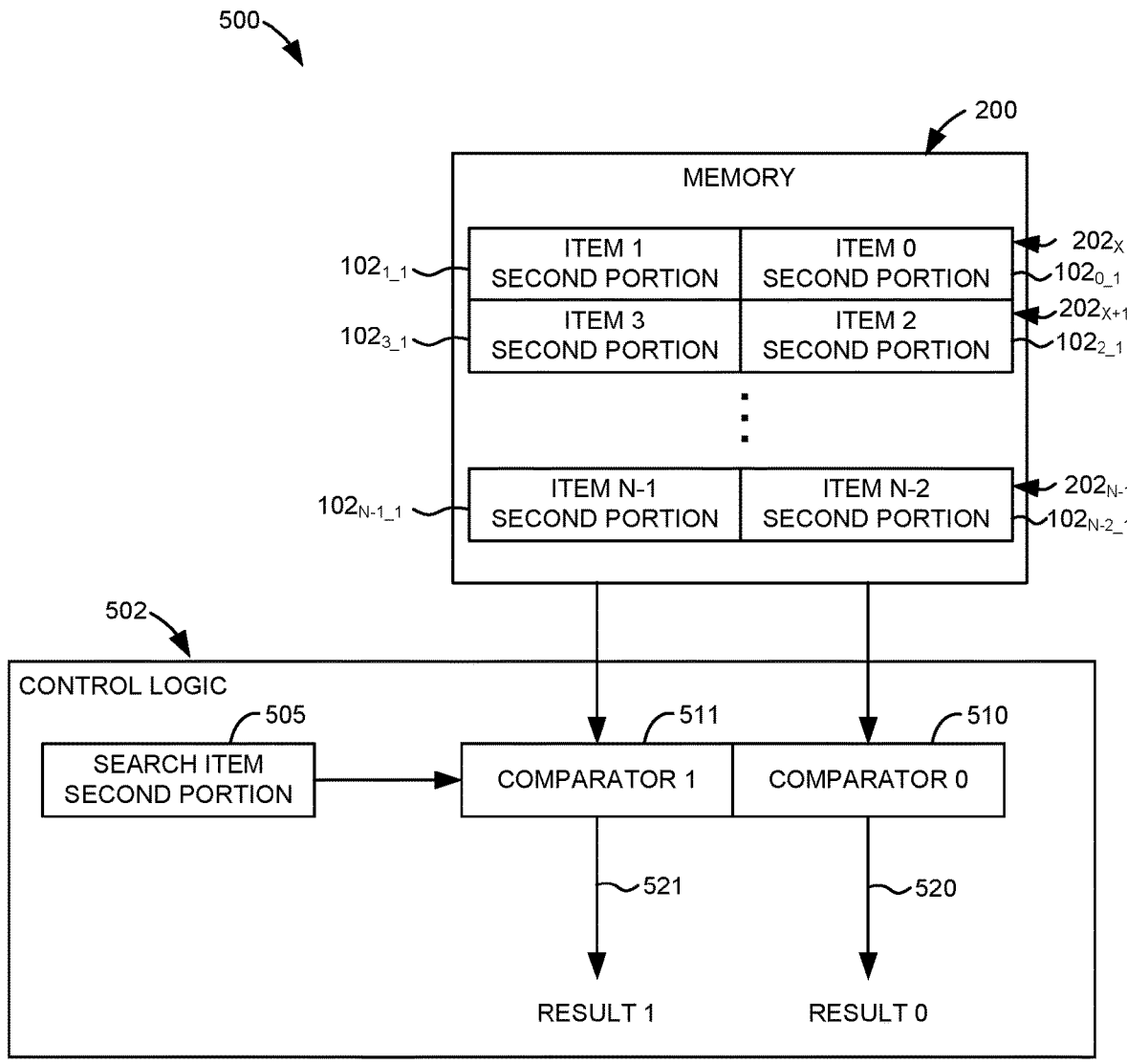

FIGS. 5A and 5B are block diagrams illustrating one example of a system 500 to perform a search operation on the list stored in the memory 200 of FIG. 2. FIG. 5A illustrates system 500 in a first phase (e.g., phase 0) of the search operation. System 500 includes memory 200 storing a list as previously described and illustrated with reference to FIG. 2 and control logic 502. Control logic 502 is communicatively coupled to the memory 200. In some examples, control logic 502 may be implemented in hardware (e.g., registers, comparators, logic gates, an application specific integrated circuit (ASIC), a field-programmable gate array (FPGA), etc.), such as by a state machine as will be described below with reference to FIG. 9. In some examples, control logic 502 may be implemented by a processing system including a central processing unit (CPU), a processor, or a microprocessor, such as will be described below with reference to FIG. 10.

Control logic 502 receives a search item and splits the search item into a search item first portion and a search item second portion. Control logic 502 is configured to compare the first portion of the search item 504 to the first portion $102_{0\_0}$ to $102_{N-1\_0}$ of each list item 0 to N−1 in each first word $202_0$ to $202_{X-1}$. In some examples, control logic 502 may include a first comparator 510 and a second comparator 511 to simultaneously compare the search item first portion 504 to the first portion of the list items stored in the first part and the second part of each word to obtain a first result at 520 and a second result at 521, respectively, for each word $202_0$ to $202_{X-1}$. Control logic 502 is configured to, in response to the first portion of the search item matching a first portion in a first word $202_0$ to $202_{X-1}$, determine the first word is a matching first word. When a first word is determined to be a matching first word, control logic 502 may store the address of the matching first word or other suitable indicator of the matching first word in a register or other suitable storage element. For example, in response to the search item first portion 504 matching the first portion $102_{2\_0}$ of item 2 in first word $202_1$, first word $202_1$ is determined to be a matching first word, and some indication (e.g., address) of first word $202_1$ is retained by control logic 502. Once each matching first word $202_0$ to $202_{X-1}$ is determined, the first phase (e.g., phase 0) of the search operation is complete. If no first words $202_0$ to $202_{X-1}$ are determined to be matching first words, the search operation is complete and control logic 502 returns a search item not found result.

FIG. 5B illustrates system 500 in a second phase (e.g., phase 1) of the search operation. In the second phase of the search operation, control logic 502 is configured to compare the second portion of the search item 505 to the second portion of each list item 0 to N−1 stored in each second word $202_X$ to $202_{N-1}$ corresponding to each matching first word determined in the first phase of the search operation as described with reference to FIG. 5A. For example, if first word $202_1$ is the only matching first word, then only corresponding second word $202_{X+1}$ is searched in the second phase. In some examples, control logic 502 may include the first comparator 510 and the second comparator 511 to simultaneously compare the search item second portion 505 to the second portion of the list items stored in the first part and the second part of each second word corresponding to a matching first word to obtain a first result at 520 and a second result at 521, respectively. Control logic 502 is configured to, in response to the second portion of the search item 505 matching a second portion of a list item in a second word corresponding to a matching first word, determine the search item matches the list item. For example, in response to the search item second portion 505 matching the second portion $102_{2\_1}$ of item 2 in second word $202_{X+1}$, item 2 is determined to match the search item. If no second words $202_{X+1}$ to $202_{N-1}$ corresponding to a matching first word include the second portion of the search item 505, the search operation is complete and control logic 502 returns a search item not found result.

Accordingly, the first phase of the search process may rule out two items for every word fetched from the memory 200. If the first portion of each list item does not match the first portion of the search item, the search will complete with N/2 words fetched from the memory 200. This is in contrast to searching the memory 100 of FIG. 1, where N words would be fetched from the memory 100 to complete the search. The probability of a partial match (e.g., where the first portion of the search item matches a list item but the second portion of the search item does not match the list item) depends on the width of the portions and the bit distribution. For example, for a width of 16 bits and a random bit distribution, the probability that either the first portion or the second portion of the search item matches a corresponding portion of a list item is $2/2^{\wedge}16=1/32,768$. For small lists (e.g., 128 items) the cumulative probability is quite small at 64/32,768 or roughly 0.2 percent. Therefore, the search may complete in N/2 memory fetches approximately 99.8 percent of the time. In addition to a faster search, less power may be consumed fetching data from the memory.

Figure 6:
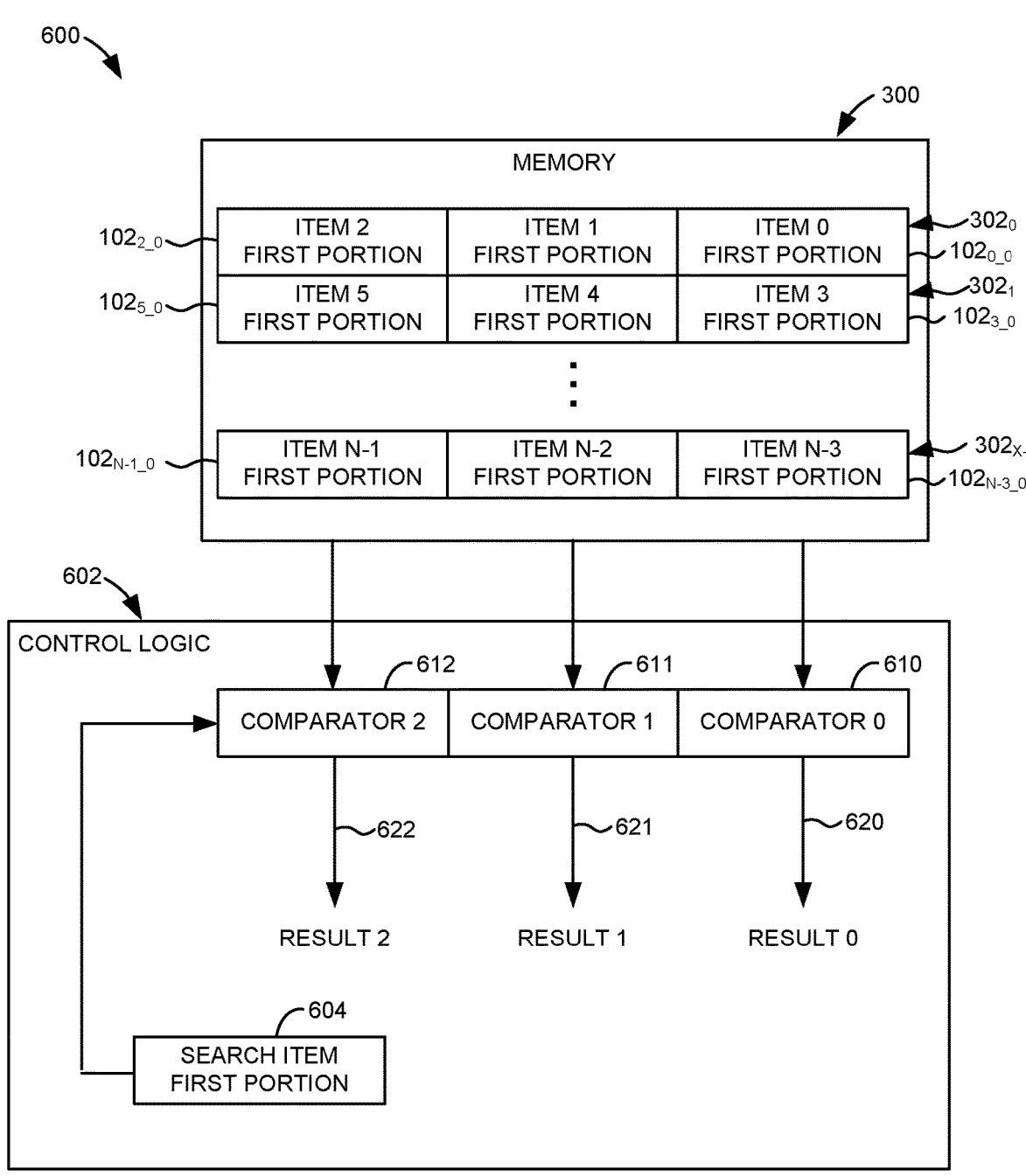
FIG. 6 is a block diagram illustrating one example of a system for performing a search operation on the list stored in the memory of FIG. 3.

FIG. 6 is a block diagram illustrating one example of a system 600 for performing a search operation on the list stored in the memory 300 of FIG. 3. While FIG. 6 illustrates system 600 in a first phase (e.g., phase 0) of the search operation, it will be apparent that system 600 is also applicable to a second phase (e.g., phase 1) and a third phase (e.g., phase 2) of the search operation similarly as described for the second phase of system 500 of FIG. 5B. System 600 includes memory 300 storing a list as previously described and illustrated with reference to FIG. 3 and control logic 602. Control logic 602 is communicatively coupled to the memory 300. In some examples, control logic 602 may be implemented in hardware (e.g., registers, comparators, logic gates, an ASIC, a FPGA, etc.), such as by a state machine as will be described below with reference to FIG. 9. In some examples, control logic 602 may be implemented by a processing system including a CPU, a processor, or a microprocessor, such as will be described below with reference to FIG. 10.

Control logic 602 receives a search item and splits the search item into a search item first portion, a search item second portion, and a search item third portion. Control logic 602 is configured to compare the first portion of the search item 604 to the first portion $102_{0\_0}$ to $102_{N-1\_0}$ of each list item 0 to N−1 in each first word $302_0$ to $302_{X-1}$. In some examples, control logic 602 may include a first comparator 610, a second comparator 611, and a third comparator 612 to simultaneously compare the search item first portion 604 to the first portion of the list items stored in the first part, the second part, and the third part of each word $302_0$ to $302_{X-1}$ to obtain a first result at 620, a second result at 621, and a third result at 622, respectively, for each word $302_0$ to $302_{X-1}$. Control logic 602 is configured to, in response to the first portion of the search item matching a first portion in a first word, determine the first word is a matching first word. For example, in response to the search item first portion 604 matching the first portion $102_{3\_0}$ of item 3 in first word $302_1$, first word $302_1$ is determined to be a matching first word. Once each matching first word $302_0$ to $302_{X-1}$ is determined, the first phase (e.g., phase 0) of the search operation is complete. If no first words $302_0$ to $302_{X-1}$ are determined to be matching first words, the search operation is complete and control logic 602 returns a search item not found result.

In a second phase (e.g., phase 1) of the search operation (not shown), control logic 602 is configured to compare the second portion of the search item to the second portion of each list item 0 to N−1 stored in each second word $302_X$ to $302_{Y-1}$ corresponding to each matching first word determined in the first phase of the search operation. Control logic 602 is configured to, in response to the second portion of the search item matching a second portion in a second word $302_X$ to $302_{Y-1}$ corresponding to a matching first word, determine the second word is a matching second word. If no second words $302_X$ to $302_{Y-1}$ are determined to be matching second words, the search operation is complete and control logic 602 returns a search item not found result.

In a third phase (e.g., phase 2) of the search operation (not shown), control logic 602 is configured to compare the third portion of the search item to the third portion of each list item 0 to N−1 stored in each third word $302_Y$ to $302_{N-1}$ corresponding to each matching second word determined in the second phase of the search operation. Control logic 602 is configured to, in response to the third portion of the search item matching a third portion in a third word $302_Y$ to $302_{N-1}$ corresponding to a matching second word, determine the search item matches the list item. If no third words $302_Y$ to $302_{N-1}$ corresponding to a matching second word include the third portion of the search item, the search operation is complete and control logic 602 returns a search item not found result.

FIG. 7 is a block diagram illustrating one example of a system 700 for performing a search operation on the list stored in the memory 400 of FIG. 4. While FIG. 7 illustrates system 700 in a first phase (e.g., phase 0) of the search operation, it will be apparent that system 700 is also applicable to a second phase (e.g., phase 1), a third phase (e.g., phase 2), and a fourth phase (e.g., phase 3) of the search operation similarly as described for the second phase of system 500 in FIG. 5B. System 700 includes memory 400 storing a list as previously described and illustrated with reference to FIG. 4 and control logic 702. Control logic 702 is communicatively coupled to the memory 400. In some examples, control logic 702 may be implemented in hardware (e.g., registers, comparators, logic gates, an ASIC, a FPGA, etc.), such as by a state machine as will be described below with reference to FIG. 9. In some examples, control logic 702 may be implemented by a processing system including a CPU, a processor, or a microprocessor, such as will be described below with reference to FIG. 10.

Control logic 702 receives a search item and splits the search item into a search item first portion, a search item second portion, a search item third portion, and a search item fourth portion. Control logic 702 is configured to compare the first portion of the search item 704 to the first portion $102_{0\_0}$ to $102_{N-1\_0}$ of each list item 0 to N−1 in each first word $402_0$ to $402_{X-1}$. In some examples, control logic 702 may include a first comparator 710, a second comparator 711, a third comparator 712, and a fourth comparator 713 to simultaneously compare the search item first portion 704 to the first portion of the list items stored in the first part, the second part, the third part, and the fourth part of each word $402_0$ to $402_{X-1}$ to obtain a first result at 720, a second result at 721, a third result at 722, and a fourth result at 723, respectively, for each word $402_0$ to $402_{X-1}$. Control logic 702 is configured to in response to the first portion of the search item matching a first portion in a first word, determine the first word is a matching first word. For example, in response to the search item first portion 704 matching the first portion $102_{4\_0}$ of item 4 in first word $402_1$, first word $402_1$ is determined to be a matching first word. Once each matching first word $402_0$ to $402_{X-1}$ is determined, the first phase (e.g., phase 0) of the search operation is complete. If no first words $402_0$ to $402_{X-1}$ are determined to be matching first words, the search operation is complete and control logic 702 returns a search item not found result.

In a second phase (e.g., phase 1) of the search operation (not shown), control logic 702 is configured to compare the second portion of the search item to the second portion of each list item 0 to N−1 stored in each second word $402_X$ to $402_{Y-1}$ corresponding to each matching first word determined in the first phase of the search operation. Control logic 702 is configured to, in response to the second portion of the search item matching a second portion in a second word $402_X$ to $402_{Y-1}$ corresponding to a matching first word, determine the second word is a matching second word. If no second words $402_X$ to $402_{Y-1}$ are determined to be matching second words, the search operation is complete and control logic 702 returns a search item not found result.

In a third phase (e.g., phase 2) of the search operation (not shown), control logic 702 is configured to compare the third portion of the search item to the third portion of each list item 0 to N−1 stored in each third word $402_Y$ to $402_{Z-1}$ corresponding to each matching second word determined in the second phase of the search operation. Control logic 702 is configured to, in response to the third portion of the search item matching a third portion in a third word $402_Y$ to $402_{Z-1}$ corresponding to a matching second word, determine the third word is a matching third word. If no third words $402_Y$ to $402_{Z-1}$ are determined to be matching third words, the search operation is complete and control logic 702 returns a search item not found result.

In a fourth phase (e.g., phase 3) of the search operation (not shown), control logic 702 is configured to compare the fourth portion of the search item to the fourth portion of each list item 0 to N−1 stored in each fourth word $402_Z$ to $402_{N-1}$ corresponding to each matching third word determined in the third phase of the search operation. Control logic 702 is configured to, in response to the fourth portion of the search item matching a fourth portion in a fourth word $402_Z$ to $402_{N-1}$ corresponding to a matching second word, determine the search item matches the list item. If no fourth words $402_Z$ to $402_{N-1}$ corresponding to a matching third word include the fourth portion of the search item, the search operation is complete and control logic 702 returns a search item not found result.

Figure 8B:
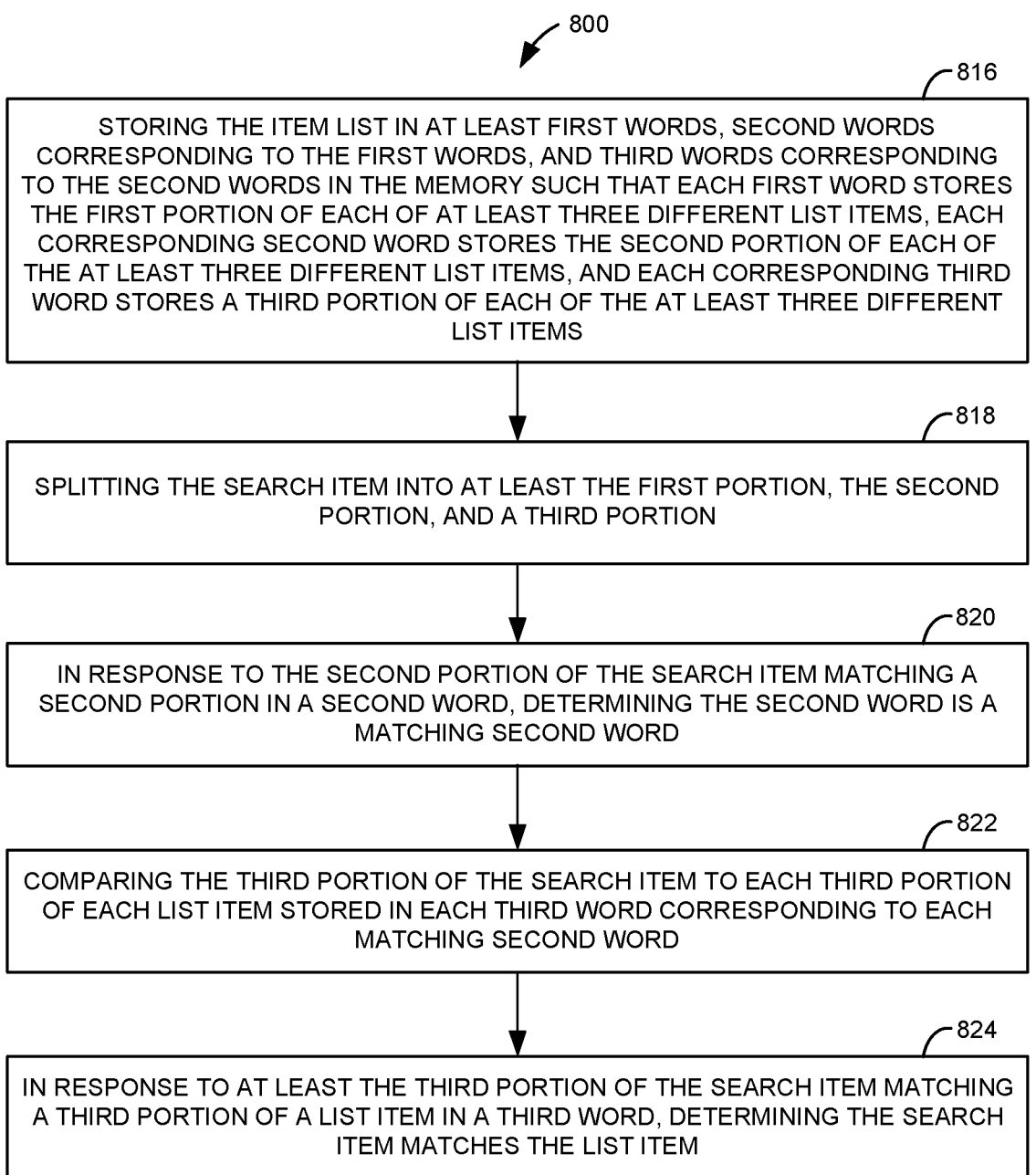

FIGS. 8A-8C are flow diagrams illustrating one example of a method 800 for performing a search operation. As illustrated in FIG. 8A at 802, method 800 includes storing an item list (e.g., items 0 to N−1) in at least first words (e.g., $202_0$ to $202_{X-1}$ of FIG. 2, $302_0$ to $302_{X-1}$ of FIG. 3, or $402_0$ to $402_{X-1}$ of FIG. 4) and second words (e.g., $202_X$ to $202_{N-1}$ of FIG. 2, $302_X$ to $302_{Y-1}$ of FIG. 3, or $402_X$ to $402_{Y-1}$ of FIG. 4) corresponding to the first words in a memory such that each first word stores a first portion (e.g., $102_{0\_0}$ to $102_{N-1\_0}$) of each of at least two different list items and each corresponding second word stores a second portion (e.g., $102_{0\_1}$ to $102_{N-1\_1}$) of each of the at least two different list items. In some examples, the item list includes an unsorted item list, such as a list of Bluetooth addresses.

At 804, method 800 includes receiving a search item. At 806, method 800 includes splitting the search item into at least a first portion (e.g., 504 of FIG. 5A) and a second portion (e.g., 505 of FIG. 5B). At 808, method 800 includes comparing the first portion of the search item to each first portion of each list item in each first word. At 810, method 800 includes in response to the first portion of the search item matching a first portion in a first word, determining the first word is a matching first word. At 812, method 800 includes comparing the second portion of the search item to each second portion of each list item stored in each second word corresponding to each matching first word. At 814, method 800 includes in response to at least the second portion of the search item matching a second portion of a list item in a second word, determining the search item matches the list item.

As illustrated in FIG. 8B at 816, method 800 may further include storing the item list in at least first words, second words corresponding to the first words, and third words (e.g., $302_Y$ to $302_{N-1}$ of FIG. 3 or $402_Y$ to $402_{Z-1}$ of FIG. 4) corresponding to the second words in the memory such that each first word stores the first portion of each of at least three different list items, each corresponding second word stores the second portion of each of the at least three different list items, and each corresponding third word stores a third portion (e.g., $102_{0\_2}$ to $102_{N-1\_2}$) of each of the at least three different list items. At 818, method 800 may further include splitting the search item into at least the first portion, the second portion, and a third portion. At 820, method 800 may further include in response to the second portion of the search item matching a second portion in a second word, determining the second word is a matching second word. At 822, method 800 may further include comparing the third portion of the search item to each third portion of each list item stored in each third word corresponding to each matching second word. At 824, method 800 may further include in response to at least the third portion of the search item matching a third portion of a list item in a third word, determining the search item matches the list item.

As illustrated in FIG. 8C at 826, method 800 may further include storing the item list in at least first words, second words corresponding to the first words, third words corresponding to the second words, and fourth words (e.g., $402_Z$ to $402_{N-1}$ of FIG. 4) corresponding to the third words in the memory such that each first word stores the first portion of each of at least four different list items, each corresponding second word stores the second portion of each of the at least four different list items, each corresponding third word stores the third portion of each of the at least four different list items, and each corresponding fourth word stores a fourth portion (e.g., $102_{0\_3}$ to $102_{N-1\_3}$) of each of the at least four different list items. At 828, method 800 may further include splitting the search item into at least the first portion, the second portion, the third portion, and a fourth portion. At 830, method 800 may further include in response to the third portion of the search item matching a third portion in a third word, determining the third word is a matching third word. At 832, method 800 may further include comparing the fourth portion of the search item to each fourth portion of each list item stored in each fourth word corresponding to each matching third word. At 834, method 800 may further include in response to at least the fourth portion of the search item matching a fourth portion of a list item in a fourth word, determining the search item matches the list item.

Figure 9:
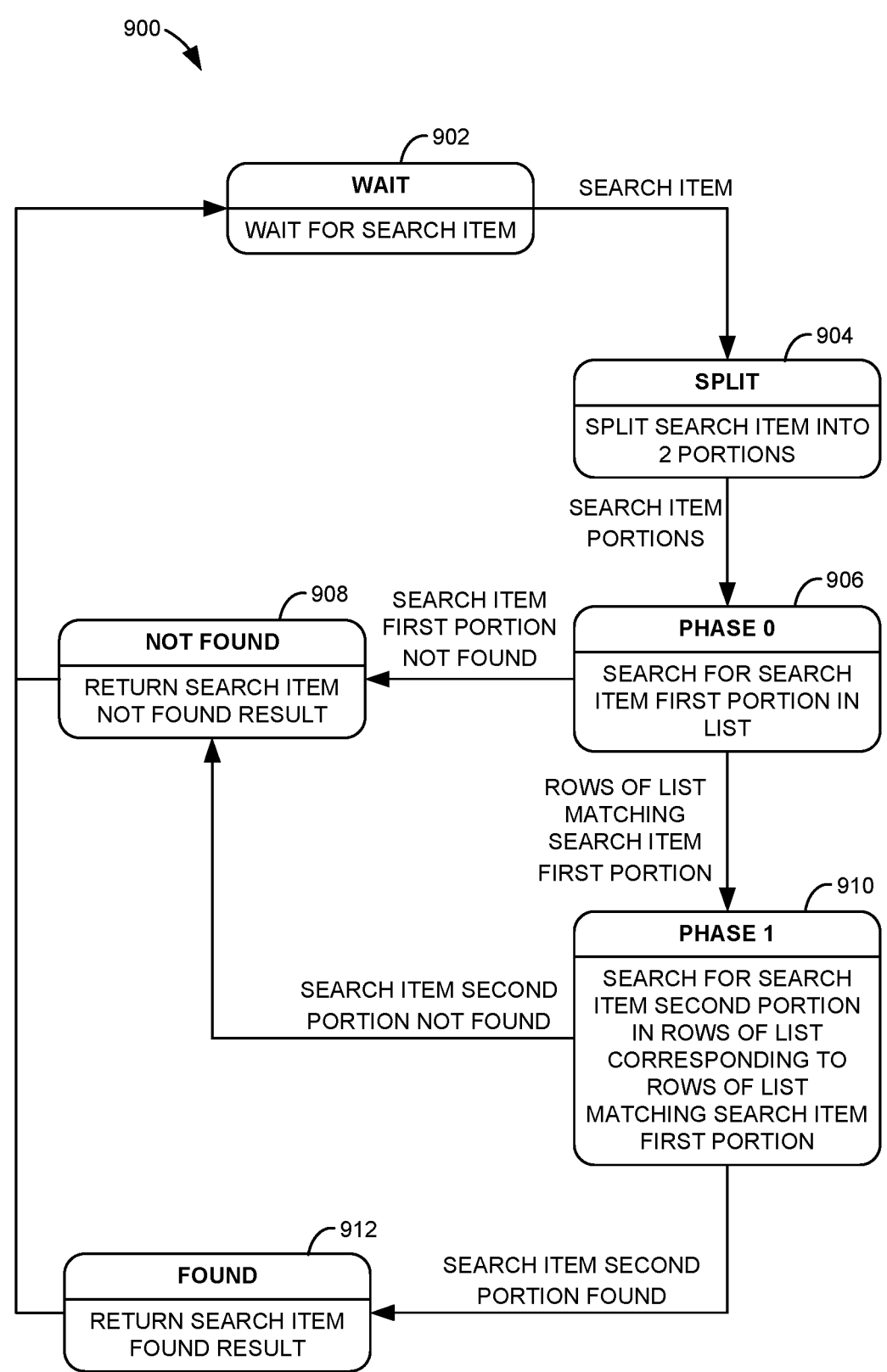
FIG. 9 is a block diagram illustrating one example of a state machine for performing a search operation.

FIG. 9 is a block diagram illustrating one example of a state machine 900 for performing a search operation, such as the search operation illustrated in FIGS. 5A and 5B. State machine 900 includes a wait state 902, a split state 904, a phase 0 state 906, a not found state 908, a phase 1 state 910, and a found state 912. In wait state 902, state machine 900 waits for a search item to be received. For example, wait state 902 may wait for a search item to be written to a search item register or other suitable storage element. Once a search item is received, control passes to split state 904, which splits the search item into two portions. For example, split state 904 may split the search item into a first (e.g., lower half) portion of the search item and a second (e.g., upper half) portion of the search item. In some examples, the search item first portion may be stored in a first register or another suitable storage element and the search item second portion may be stored in a second register or another suitable storage element. With the search item split into two portions, control passes to phase 0 state 906.

Phase 0 state 906 searches for the search item first portion in a list (e.g., list of items 0 to N−1 stored in memory 200 of FIG. 2). For example, in phase 0 state 906, the search item first portion (e.g., 504 of FIG. 5A) may be compared via comparators (e.g., 510 and 511 of FIG. 5A) to the first portion of each list item stored in each first word (e.g., $202_0$ to $202_{X-1}$ of FIG. 5A) of the memory. If the search item first portion is not found in the list, control passes to not found state 908, which returns a search item not found result. Control then returns to wait state 902. In response to finding the search item first portion in the list (e.g., in a first word of the memory), phase 0 state 906 indicates the row(s) of the list matching the search item first portion. For example, the address or another suitable indicator of each row of the list matching the search item first portion may be stored in a register or another suitable storage element. Control then passes to phase 1 state 910.

Phase 1 state 910 searches for the search item second portion in rows of the list corresponding to rows of the list matching the search item first portion (e.g., as indicated in phase 0 state 906). For example, in phase 1 state 910, the search item second portion (e.g., 505 of FIG. 5B) may be compared via comparators (e.g., 510 and 511 of FIG. 5B) to the second portion of each list item stored in each second word (e.g., $202_X$ to $202_{N-1}$ of FIG. 5B) of the memory corresponding to a matching first word from phase 0 state 906. If the search item second portion is not found in the list, control passes to not found state 908, which returns a search item not found result. Control then returns to wait state 902. In response to finding the search item second portion in the list (e.g., in a corresponding second word of the memory), phase 1 state 910 indicates the search item second portion has been found and control passes to found state 912. Found state 912 returns a search item found result. Control then returns to wait state 902 to wait for another search item to search.

It will be apparent that state machine 900 may be expanded to perform the search operation described with reference to FIG. 6 or 7 or method 800 of FIGS. 8A-8C by adding additional phase states (e.g., a phase 2 state, a phase 3 state).

Figure 10:
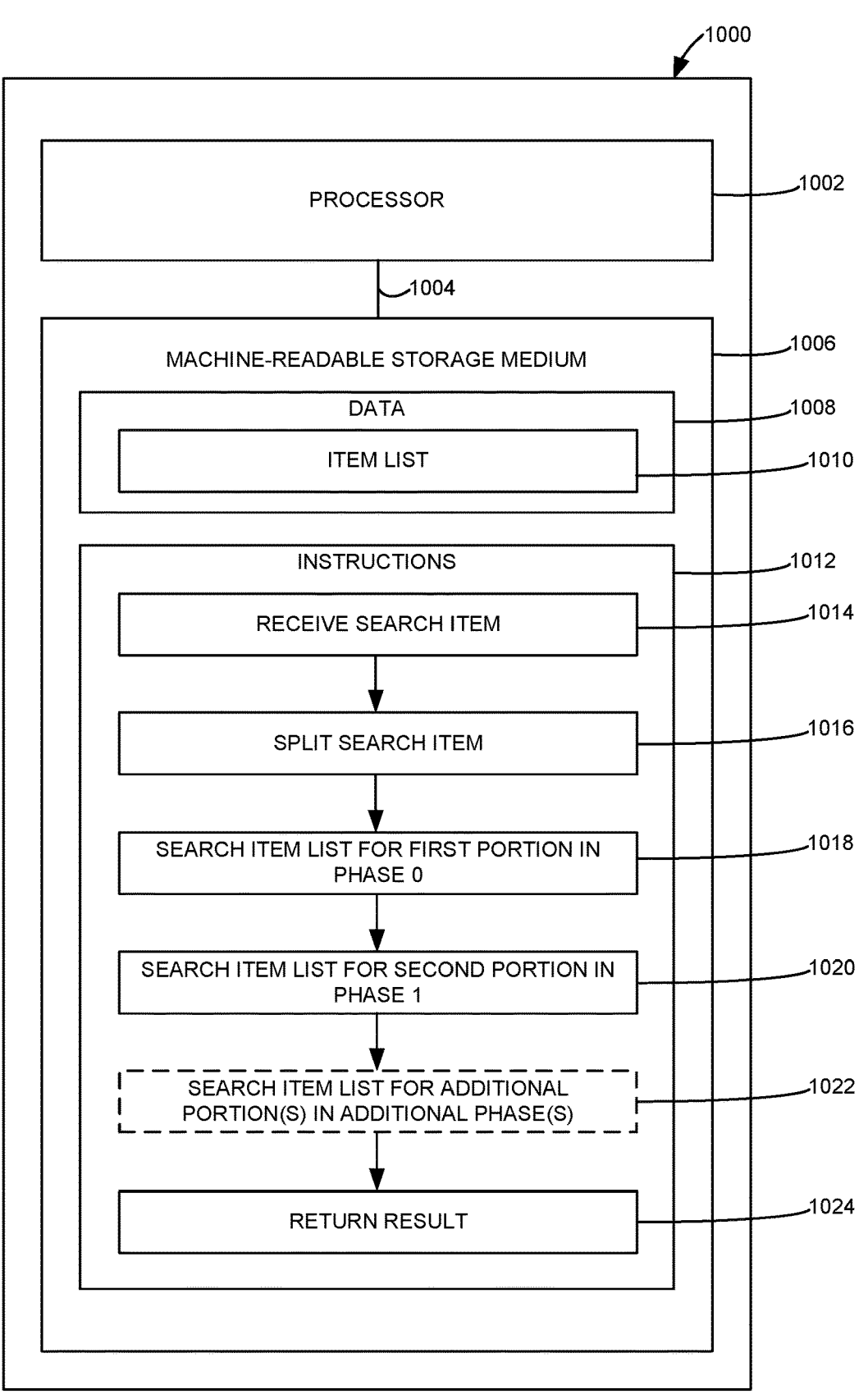
FIG. 10 is a block diagram illustrating one example of a processing system for performing a search operation.

FIG. 10 is a block diagram illustrating one example of a processing system 1000 for performing a search operation. In some examples, processing system 1000 may perform the search operation described with reference to FIG. 5A-5B, 6, or 7 or method 800 of FIGS. 8A-8C. Processing system 1000 includes a processor 1002 and a machine-readable storage medium 1006. Processor 1002 is communicatively coupled to machine-readable storage medium 1006 through a communication path 1004. Although the following description refers to a single processor and a single machine-readable storage medium, the description may also apply to a system with multiple processors and multiple machine-readable storage mediums. In such examples, the data and instructions may be distributed (e.g., stored) across multiple machine-readable storage mediums and the instructions may be distributed (e.g., executed by) across multiple processors.

Processor 1002 includes one (i.e., a single) central processing unit (CPU) or microprocessor or more than one (i.e., multiple) CPU or microprocessor, and/or other suitable hardware devices for retrieval and execution of instructions stored in machine-readable storage medium 1006. Machine-readable storage medium 1006 may include a data memory 1008 and an instruction memory 1012. Data memory 1008 may store an item list 1010, such as previously described with reference to FIG. 2, 3, or 4. Processor 1002 may fetch, decode, and execute instructions 1014-1024 to perform a search of the item list 1010.

Processor 1002 may fetch, decode, and execute instructions 1014 to receive a search item. Processor 1002 may fetch, decode, and execute instructions 1016 to split the search item. For example, processor 1002 may split the search item into two portions as described with reference to FIGS. 5A and 5B, three portions as described with reference to FIG. 6, or four portions as described with reference to FIG. 7 depending upon how the item list 1010 is stored in the data memory 1008.

Processor 1002 may fetch, decode, and execute instructions 1018 to search the item list for the first portion in a first phase (i.e., phase 0) of the search. For example, processor 1002 may search for the search item first portion in first words of item list 1010 (where the first portion of at least two items of the list are stored in each first word) and determine which first words (if any) include a matching search item first portion. Processor 1002 may fetch, decode, and execute instructions 1020 to search the item list for the search item second portion in a second phase (i.e., phase 1) of the search. For example, processor 1002 may search for the search item second portion in second words of item list 1010 (where the second portion of at least two items of the list are stored in each second word) corresponding to matching first words and determine which second words (if any) include a matching search item second portion.

If the items in item list 1010 stored in the memory 1008 are split into two portions (e.g., FIG. 2), instructions 1022 are excluded. If the items in item list 1010 stored in the memory 1008 are split into three portions (e.g., FIG. 3) or four portions (e.g., FIG. 4), processor 1002 may fetch, decode, and execute further instructions 1022 to search the item list for additional portion(s) of the search item in additional phase(s) (i.e., phase 2, phase 3). For example, in response to the search item being split into three portions, in a phase 2, processor 1002 may search for the search item third portion in third words of item list 1010 (where the third portion of at least three items of the list are stored in each third word) corresponding to matching second words and determine which third words (if any) include a matching search item third portion. In response to the search item being split into four portions, in a phase 3, processor 1002 may further search for the search item fourth portion in fourth words of item list 1010 (where the fourth portion of at least four items of the list are stored in each fourth word) corresponding to matching third words and determine which fourth words (if any) include a matching search item fourth portion.

Processor 1002 may fetch, decode, and execute instructions 1024 to return a result. For example, in response to the search item first portion not matching a first word in phase 0, processor 1002 returns a search item not found result. In response to the search item second portion not matching a second word in phase 1, processor 1002 returns a search item not found result. In response to the search item being split into two portions and in response to the search item second portion matching a second word in phase 1, processor 1002 returns a search item found result. In response to the search item being split into three portions and in response to the search item third portion not matching a third word in phase 2, processor 1002 returns a search item not found result. In response to the search item being split into three portions and in response to the search item third portion matching a third word in phase 2, processor 1002 returns a search item found result. In response to the search item being split into four portions and in response to the search item fourth portion not matching a fourth word in phase 3, processor 1002 returns a search item not found result. In response to the search item being split into four portions and in response to the search item fourth portion matching a fourth word in phase 3, processor 1002 returns a search item found result.

As an alternative or in addition to retrieving and executing instructions, processor 1002 may include one (i.e., a single) electronic circuit or more than one (i.e., multiple) electronic circuit comprising a number of electronic components for performing the functionality of one of the instructions or more than one of the instructions in instruction memory 1012 of machine-readable storage medium 1006. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 1006 is a non-transitory storage medium and may be any suitable electronic, magnetic, optical, or other physical storage device that stores executable instructions. Thus, machine-readable storage medium 1006 may be, for example, a random access memory (RAM), an electrically-erasable programmable read-only memory (EEPROM), a storage drive, an optical disc, and the like. Machine-readable storage medium 1006 may be disposed within an electronic device (e.g., computer, smartphone, tablet, smart device, etc.). In this case, the executable instructions may be installed on the electronic device. Alternatively, machine-readable storage medium 1006 may be a portable, external, or remote storage medium that allows the electronic device to download the instructions from the portable/external/remote storage medium. In this case, the executable instructions may be part of an installation package.

It is to be understood that the features of the various exemplary embodiments described herein may be combined with each other, unless specifically noted otherwise.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A system comprising:
a memory storing an item list in first words and second words corresponding to the first words such that each first word stores a first portion of each of two different list items and each corresponding second word stores a second portion of each of the two different list items; and
control logic communicatively coupled to the memory, the control logic configured to:
split a search item into at least a first portion and a second portion;
compare the first portion of the search item to the first portion of each list item in each first word;

in response to the first portion of the search item matching a first portion in a first word, determine the first word is a matching first word;

compare the second portion of the search item to the second portion of each list item stored in each second word corresponding to each matching first word; and in response to the second portion of the search item matching a second portion of a list item in a second word, determine the search item matches the list item.

2. The system of claim 1, wherein the first portion of each list item comprises a lower half of each list item and the second portion of each list item comprises an upper half of each list item.

3. The system of claim 1, wherein the second words are stored in the memory immediately following the first words.

4. The system of claim 1, wherein the item list comprises an unsorted item list.

5. The system of claim 1, wherein the control logic comprises a processor.

6. The system of claim 1, wherein the control logic comprises two comparators.

7. The system of claim 1, wherein the item list comprises a list of Bluetooth addresses.

8. A system comprising: a memory storing an item list in at least first words and second words corresponding to the first words such that each first word stores a first portion of each of at least two different list items and each corresponding second word stores a second portion of each of the at least two different list items; and control logic communicatively coupled to the memory, the control logic configured to: receive a search item; split the search item into at least a first portion and a second portion; compare the first portion of the search item to each first portion of each list item in each first word; in response to the first portion of the search item matching a first portion in a first word, determine the first word is a matching first word;

compare the second portion of the search item to each second portion of each list item stored in each second word corresponding to each matching first word; and in response to at least the second portion of the search item matching a second portion of a list item in a second word, determine the search item matches the list item.

9. The system of claim 8, wherein the memory stores the item list in at least first words, second words corresponding to the first words, and third words corresponding to the second words such that each first word stores the first portion of each of at least three different list items, each corresponding second word stores the second portion of each of the at least three different list items, and each corresponding third word stores a third portion of each of the at least three different list items, and wherein the control logic is further configured to: split the search item into at least the first portion, the second portion, and a third portion; in response to the second portion of the search item matching a second portion in a second word, determine the second word as a matching second word; compare the third portion of the search item to each third portion of each list item stored in each third word corresponding to each matching second word; and in response to at least the third portion of the search item matching a third portion of a list item in a third word, determine the search item matches the list item.

10. The system of claim 9, wherein the memory stores the item list in at least first words, second words corresponding to the first words, third words corresponding to the second words, and fourth words corresponding to the third words such that each first word stores the first portion of each of at least four different list items, each corresponding second word stores the second portion of each of the at least four different list items, each corresponding third word stores a third portion of each of the at least four different list items, and each corresponding fourth word stores a fourth portion of each of the at least four different list items, and wherein the control logic is further configured to: split the search item into at least the first portion, the second portion, the third portion, and a fourth portion; in response to the third portion of the search item matching a third portion in a third word, determine the third word is a matching third word; compare the fourth portion of the search item to each fourth portion of each list item stored in each fourth word corresponding to each matching third word; and in response to at least the fourth portion of the search item matching a fourth portion of a list item in a fourth word, determine the search item matches the list item.

11. The system of claim 8, wherein the second words are stored in the memory immediately following the first words.

12. The system of claim 8, wherein the item list comprises an unsorted item list.

13. The system of claim 8, wherein the control logic comprises a processor.

14. The system of claim 8, wherein the control logic comprises at least two comparators.

15. The system of claim 8, wherein the item list comprises a list of Bluetooth addresses.

16. A method comprising: storing an item list in at least first words and second words corresponding to the first words in a memory such that each first word stores a first portion of each of at least two different list items and each corresponding second word stores a second portion of each of the at least two different list items; receiving a search item; splitting the search item into at least a first portion and a second portion; comparing the first portion of the search item to each first portion of each list item in each first word; in response to the first portion of the search item matching a first portion in a first word, determining the first word is a matching first word; comparing the second portion of the search item to each second portion of each list item stored in each second word corresponding to each matching first word; and in response to at least the second portion of the search item matching a second portion of a list item in a second word, determining the search item matches the list item.

17. The method of claim 16, wherein storing the item list comprises storing the item list in at least first words, second words corresponding to the first words, and third words corresponding to the second words in the memory such that each first word stores the first portion of each of at least three different list items, each corresponding second word stores the Title LIST SEARCH second portion of each of the at least three different list items, and each corresponding third word stores a third portion of each of the at least three different list items, and wherein splitting the search item comprises splitting the search item into at least the first portion, the second portion, and a third portion, the method further comprising: in response to the second portion of the search item matching a second portion in a second word, determining the second word is a matching second word; comparing the third portion of the search item to each third portion of each list item stored in each third word corresponding to each matching second word; and in response to at least the third portion of the search item matching a third portion of a list item in a third word, determining the search item matches the list item.

18. The method of claim 17, wherein storing the item list comprises storing the item list in at least first words, second words corresponding to the first words, third words corresponding to the second words, and fourth words corresponding to the third words in the memory such that each first word stores the first portion of each of at least four different list items, each corresponding second word stores the second portion of each of the at least four different list items, each corresponding third word stores the third portion of each of the at least four different list items, and each corresponding fourth word stores a fourth portion of each of the at least four different list items, and wherein splitting the search item comprises splitting the search item into at least the first portion, the second portion, the third portion, and a fourth portion, the method further comprising: in response to the third portion of the search item matching a third portion in a third word, determining the third word is a matching third word; comparing the fourth portion of the search item to each fourth portion of each list item stored in each fourth word corresponding to each matching third word; and in response to at least the fourth portion of the search item matching a fourth portion of a list item in a fourth word, determining the search item matches the list item.

19. The method of claim 16, wherein the item list comprises an unsorted item list.

20. The method of claim 16, wherein the item list comprises a list of Bluetooth addresses.

\* \* \* \* \*